United States Patent [19]
Woodside et al.

[11] Patent Number: 5,891,284
[45] Date of Patent: Apr. 6, 1999

[54] MANUFACTURE OF A UNIDIRECTIONAL COMPOSITE FABRIC

[75] Inventors: Andrew B. Woodside; Margaret M. Woodside, both of Pickerington; Douglas B. Mann, Westerville, all of Ohio

[73] Assignee: Owens Corning Fiberglas Technology, Inc., Summit, Ill.

[21] Appl. No.: 935,167

[22] Filed: Sep. 22, 1997

Related U.S. Application Data

[63] Continuation of Ser. No. 527,601, Sep. 13, 1995, abandoned.

[51] Int. Cl.$^6$ .............................. B32B 31/20; D02J 11/00
[52] U.S. Cl. ......................... 156/148; 156/166; 156/180; 156/181; 156/296
[58] Field of Search .................................... 156/148, 166, 156/173, 175, 309.6, 181, 180, 296; 28/282, 103, 283, 274; 264/103

[56] References Cited

U.S. PATENT DOCUMENTS

| | | |
|---|---|---|
| 2,915,806 | 12/1959 | Grant . |
| 3,019,078 | 1/1962 | Roberson . |

(List continued on next page.)

FOREIGN PATENT DOCUMENTS

| | | |
|---|---|---|
| 138294A2 | 4/1985 | European Pat. Off. . |
| 182335A2 | 5/1986 | European Pat. Off. . |
| 602618A1 | 6/1994 | European Pat. Off. . |
| 616055 | 8/1994 | European Pat. Off. . |
| 367661 | 5/1990 | France . |
| 505274 | 9/1992 | France . |
| 505275 | 9/1992 | France . |
| 4218860 | 12/1993 | Germany . |
| 5-138748 | 6/1993 | Japan . |
| 2105247 | 3/1983 | United Kingdom . |

OTHER PUBLICATIONS

Research Disclosure Bulletin #20239, Feb., 1981, p. 100.
Reinforced Plastics Newsletter, Market Search, Inc. vol. XVIII, No. 38, Sep. 6, 1994.
The Long and Short of Fiber—Reinforced Thermoplastics, Advanced Materials, ICI.
McConnell, "Metal Replacements", Plastics Design Forum Nov./Dec. 1989, pp. 35–37, 41–42, 46, 48.

(List continued on next page.)

*Primary Examiner*—Jeff H. Aftergut
*Attorney, Agent, or Firm*—C. Michael Gegenheimer; Inger H. Eckert; Robert L. Showalter

[57] ABSTRACT

A method and apparatus are provided for forming a fabric, suitable for mailing a finished composite product, using one or more composite strands. One embodiment of the apparatus comprises at least one bushing for forming reinforcing fibers; supply equipment for supplying matrix fibers; at least one applicator for applying bonding size (i.e., bonding chemical treatment) to the fibers; a gathering mechanism for gathering the treated fibers into at least one composite strand; a pulling mechanism for pulling the at least one composite strand; and a fabric forming mechanism for forming a fabric using the at least one composite strand. One embodiment of the method comprises the steps of drawing a plurality of reinforcing fibers; supplying a plurality of preformed matrix fibers; applying bonding size directly to the reinforcing fibers and the matrix fibers from one or more applicators at least before the reinforcing fibers are gathered together into a strand; gathering the fibers together into at least one composite strand; and forming the at least one composite strand into a unidirectional fabric. The resulting unidirectional fabric comprises a plurality of stitching threads and a continuous glass/polymer composite strand in the form of a plurality of transverse loops. The composite strand can comprise a plurality of first reinforcing fibers drawn from a bushing of molten glass, a plurality of preformed matrix fibers made from a polymer matrix material, and bonding size which bonds together the fibers of the composite strand.

8 Claims, 6 Drawing Sheets

5,891,284
Page 2

U.S. PATENT DOCUMENTS

| | | |
|---|---|---|
| 3,042,570 | 7/1962 | Bradt . |
| 3,091,018 | 5/1963 | Rees . |
| 3,134,704 | 5/1964 | Modiglani . |
| 3,144,687 | 8/1964 | Skalko et al. . |
| 3,175,351 | 3/1965 | Bloch . |
| 3,265,482 | 8/1966 | Langlois et al. . |
| 3,268,312 | 8/1966 | Grant . |
| 3,276,931 | 10/1966 | Rees . |
| 3,453,652 | 7/1969 | Marzocchi . |
| 3,648,459 | 3/1972 | Fürst et al. . |
| 3,701,267 | 10/1972 | Furst . |
| 3,718,448 | 2/1973 | Drummond et al. . |
| 3,737,112 | 6/1973 | Tellerman et al. . |
| 3,849,847 | 11/1974 | Corbiere . |
| 3,887,347 | 6/1975 | Reese . |
| 3,918,947 | 11/1975 | Maaghul et al. . |
| 4,013,435 | 3/1977 | Kane et al. . |
| 4,042,360 | 8/1977 | Kane et al. . |
| 4,060,999 | 12/1977 | Marks et al. . |
| 4,528,223 | 7/1985 | Kumazawa et al. . |
| 4,567,102 | 1/1986 | Pollet et al. . |
| 4,799,985 | 1/1989 | McMahon et al. ................... 28/283 X |
| 5,000,807 | 3/1991 | Stuart ...................................... 156/166 |
| 5,011,523 | 4/1991 | Roncato et al. . |
| 5,026,410 | 6/1991 | Pollet et al. . |
| 5,042,111 | 8/1991 | Iyer et al. . |
| 5,042,122 | 8/1991 | Iyer et al. . |
| 5,055,119 | 10/1991 | Flautt et al. . |
| 5,102,690 | 4/1992 | Iyer et al. . |
| 5,123,373 | 6/1992 | Iyer et al. . |
| 5,128,199 | 7/1992 | Iyer et al. . |
| 5,134,959 | 8/1992 | Woodmansee et al. . |
| 5,176,775 | 1/1993 | Montsinger . |
| 5,177,840 | 1/1993 | Laws ..................................... 28/282 X |
| 5,227,236 | 7/1993 | Handermann .......................... 428/361 |
| 5,236,743 | 8/1993 | Bates et al. . |
| 5,241,731 | 9/1993 | Stuart ................................. 156/166 X |
| 5,316,561 | 5/1994 | Roncato et al. . |
| 5,328,493 | 7/1994 | Roncato et al. . |
| 5,425,796 | 6/1995 | Loubineux et al. . |
| 5,451,355 | 9/1995 | Boissonnat . |
| 5,456,983 | 10/1995 | Sassa . |
| 5,626,643 | 5/1997 | Woodside et al. ........................ 65/442 |

OTHER PUBLICATIONS

"Reinforcements, fillers, climb higher performance hurdles", Plastiscope.

Reinforced Plastics Newsletter, Market Search, Inc., vol. XIX, No. 6, Mar. 20, 1995.

Wenger et al., "Advancements in Glass Reinforced Thermoplastics—the Long and the Short Story", Akzo Engineering Plastics, Inc. Evansville, Indiana.

Sajna, J. SAE Technical Paper Series #930168, Effects of Reinforcing Fiber Length on the Properties of Injection Molded Polypropylene, International Congress and Exposition Detroit, Michigan Mar. 1–5, 1993.

MANUFACTURE OF A UNIDIRECTIONAL COMPOSITE FABRIC

CROSS-REFERENCE TO RELATED APPLICATION(S)

This is a continuation of U.S. patent application Ser. No. 08/527,601, filed Sep. 13, 1995, now abandoned.

TECHNICAL FIELD

The present invention relates generally to composite product manufacture, more particularly, to a method and apparatus for forming a composite fabric suitable for making composite products and, even more particularly, to a method and apparatus for knitting a unidirectional composite fabric from at least one resilient and cohesive composite strand of commingled reinforcing glass and matrix polymer fibers.

BACKGROUND ART

A variety of apparatus and methods exist for producing glass/polymer composite strands, from which finished composite products are intended to be made. Methods such as solution processing, slurry processing, and melt impregnation involve passing a finished glass fiber tow or yarn through a polymer-containing liquid. The polymer clings to the tow and results in a composite preimpregnated ("prepreg") tow. Yet another method, called dry powder impregnation, involves applying a thermoplastic powder to a glass fiber tow and then applying heat to sinter the powder particles to the glass fibers.

All of the above-mentioned methods have various disadvantages. A common disadvantage exhibited by the above methods is the need for one or more off-line processing steps of spreading the glass tow and applying the polymer to the glass tow to produce a suitably commingled composite strand. Such off-line steps increase the complexity and cost of producing the composite strand, and thus the cost of a finished composite product made therefrom.

Another method for producing a glass/polymer composite strand includes commingling glass and polymer fibers using an in-line process. Such a process is disclosed in U.S. Pat. Nos. 5,011,523 and 5,425,796. Methods such as that disclosed in the 5,011,523 patent have several disadvantages. Of particular interest is the problem of the location of the polymer fibers within the finished strand. Specifically, the disclosed composite strand does not have polymer and glass fibers evenly distributed throughout the strand cross section. Rather, the polymer fibers, which will eventually form the thermoplastic matrix of a finished composite product, merely encompasses a single tow or multiple split tows of the glass fibers. Thus, the composite strand is more likely to contain relatively large grouping of glass fibers which are substantially devoid of the polymer fibers (i.e., the thermoplastic matrix material).

Methods such as that disclosed in the U.S. Pat. No. 5,425,796 patent also have several disadvantages. It has been found that because only the glass fibers are sized before the glass and polymer fibers are combined, the polymer fibers are less likely to be bonded to one another or to adjacent glass fibers. In addition, the amount of size that is used is typically very small. That is, the dry weight content of size in the resulting composite strand is believed to be less than about 1.0%. Therefore, a composite strand formed according to such a process is more likely to include glass and polymer fibers that are weakly bound together, if at all. With such weak or, in some areas, nonexistent bonding of the fibers, such a composite strand is less likely to be sufficiently coherent, and remain so, during subsequent processing into a finished composite product.

Accordingly, there is a need for an improved process for forming a glass/polymer composite strand having glass reinforcing fibers and matrix polymer fibers that are more evenly distributed and more fully bonded together throughout the composite strand cross section, such that it is more likely that the resulting composite strand will be and will remain sufficiently resilient and coherent to be subsequently processable into a finished composite product having optimized properties. There is also a need for a more efficient and economical process for forming a unidirectional fabric with a glass/polymer composite strand and, subsequently, for making a finished composite product using the resulting glass/polymer composite unidirectional fabric.

DISCLOSURE OF INVENTION

These needs are met by providing an apparatus and method according to the present invention, whereby at least one glass/polymer composite strand is formed which is sufficiently resilient, coherent and homogenous enough to be formed into at least one unidirectional fabric and remains so during subsequent processing of the fabric into a finished composite product such that the properties of the composite product are optimized. These needs are further met by providing an in-line apparatus and method for forming at least one unidirectional fabric from such a composite strand.

In accordance with a first aspect of the present invention, an apparatus is provided for forming a fabric with one or more composite strands. One broad embodiment of the present apparatus comprises at least one bushing containing molten glass for forming a plurality of glass fibers; a drawing mechanism for drawing the glass fibers from the bushing; supply equipment for supplying a polymer matrix material to the glass fibers; a gathering mechanism for gathering the glass fibers into at least one composite strand and a fabric forming mechanism disposed in-line with the gathering mechanism and adapted for forming a fabric using the at least one composite strand. Another broad embodiment of the present apparatus comprises at least one bushing containing molten glass for forming a plurality of glass fibers; a drawing mechanism for drawing the glass fibers from the bushing; supply equipment for supplying a polymer matrix material to the glass fibers; a gathering mechanism for gathering the glass fibers into at least one composite strand and a fabric forming mechanism adapted for forming a unidirectional fabric using the at least one composite strand. An additional broad embodiment of the present apparatus comprises at least one bushing for forming reinforcing fibers; supply equipment for supplying matrix fibers; at least one applicator for applying bonding size (i.e., bonding chemical treatment) to the reinforcing fibers and the matrix fibers; a gathering mechanism for gathering the chemically treated fibers into at least one composite strand; a pulling mechanism for pulling the at least one composite strand; and at least one fabric forming mechanism for forming a unidirectional fabric using the at least one composite strand.

In a further embodiment of the present apparatus, the fiber forming bushing contains molten glass for forming a plurality of first reinforcing fibers made of the glass. The drawing mechanism draws a plurality of first glass reinforcing fibers from the bushing. The fiber supply equipment provides a plurality of preformed (i.e., previously manufactured and collected) matrix fibers. It is desirable for the
} preformed matrix fibers to be disposed on a spool or otherwise packaged so as to be readily removable for processing through the present apparatus. The matrix fibers are made from a polymer matrix material which is suitable for forming at least part of the matrix of a finished composite product made with the unidirectional fabric. One or more applicators apply bonding size (i.e., a bonding chemical treatment) to the reinforcing fibers and the matrix fibers, thereby forming chemically treated fibers, at least before the glass reinforcing fibers are gathered together into a strand. It is desirable for the bonding size to be applied before the reinforcing fibers and matrix fibers are commingled. In some applications, it may also be desirable for the matrix fibers to have already been chemically treated and be in the form of a tow before being commingled with the reinforcing fibers.

It is desirable for the reinforcing fibers and the matrix fibers to be spread apart before they are coated with bonding size. By separating the fibers before bonding size is applied, each fiber is more likely to be fully coated by the bonding size. It is believed that the glass/polymer composite strands, made according to the principles of the present invention, are more coherent and resilient than prior glass/polymer composite strands because each fiber is more fully coated with the chemical treatment, there is more chemical treatment being applied to the fibers (i.e., more chemical treatment present in the resulting composite strand) and/or because the reinforcing and matrix fibers are chemically treated at least before the glass reinforcing fibers are gathered into a strand. Because they are more coherent and resilient, the present composite strands are more capable of being successfully formed into a unidirectional fabric.

The gathering mechanism (e.g., a gathering shoe) is used to gather together the reinforcing fibers and the matrix fibers into one or more glass/polymer composite strands. One or more fabric forming mechanisms (e.g., one or more warp knitting machines) knit the one or more composite strands into unidirectional fabric. The one or more composite strands are either packaged and then knitted into the unidirectional fabric off-line or the knitting mechanism is connected in-line with the gathering mechanism and the fabric is formed continuously as the composite strand is formed. The in-line arrangement is preferred because it is more efficient and reduces manufacturing costs.

The drawing mechanism can comprise a strand pulling mechanism (e.g., a pull wheel) and may also include the fabric forming mechanism. For the in-line arrangement, the strand pulling mechanism is adapted for pulling the one or more composite strands, and therefore drawing the glass reinforcing fibers, during at least a set-up stage of the apparatus. After the apparatus has been set-up, the fabric forming mechanism may also be adapted to replace or supplement the strand pulling mechanism in providing the pulling force needed to continuously form the one or more composite strands.

The supply equipment can be adapted to provide one or more preformed second reinforcing fibers, in addition to the first or drawn glass reinforcing fibers. Bonding size can be applied to the second reinforcing fibers with a separate applicator or the same applicator used for coating the first reinforcing fibers and/or the matrix fibers.

It may be desirable for the one or more applicators to apply an aqueous based bonding size to the fibers. Alternatively, a one- or two-part non-aqueous based bonding size may also be desirable. If an aqueous based bonding size is used, a dryer will likely be used for contacting and transferring energy in the form of heat to the chemically treated fibers so as to dry the aqueous based bonding size before the treated fibers are gathered into the one or more glass/polymer composite strands. If a non-aqueous bonding size is used, the chemically treated fibers may not need to be dried before being gathered.

In another embodiment of the present apparatus, a plurality of glass/polymer composite strands are formed, the fabric forming mechanism used is a plurality of knitting machines, and each of the knitting machines is adapted for forming a unidirectional fabric using at least one of the glass/polymer composite strands.

In accordance with a second aspect of the present invention, a method is provided for forming a unidirectional fabric with at least one composite strand. Broadly, the present method comprises the steps of drawing a plurality of reinforcing fibers; supplying a plurality of matrix fibers; applying bonding size directly to the reinforcing fibers and the matrix fibers from one or more applicators at least before the reinforcing fibers are gathered together into a strand; gathering the reinforcing fibers and the matrix fibers together into at least one composite strand; and knitting in-line with the drawing and gathering steps the at least one composite strand into a unidirectional fabric.

In one embodiment of the present method, a plurality of first reinforcing fibers are drawn from a source of molten glass and a supply of preformed (i.e., previously manufactured and collected) matrix fibers, made from a polymer matrix material, are provided. One or more preformed second reinforcing fibers may also be supplied. Bonding size is applied directly to the reinforcing fibers and the matrix fibers using one or more applicators before the reinforcing and matrix fibers are commingled together and gathered into a strand. It may be desirable, in some situations, for the matrix fibers to be in the form of one or more tows (or yarns) of multiple fibers before being commingled and gathered with the reinforcing fibers. In other situations, it may be desirable for the fibers to be in individual form before being commingled and gathered with the reinforcing fibers.

Whatever form the matrix fibers are in before being commingled and gathered, it has been found desirable for the bonding size to be applied to each type of the fibers used in the present composite strand at some point while the fibers being chemically treated are spread apart or otherwise separated. By applying bonding size while the fibers are separated and before the fibers are gathered or otherwise grouped together into a strand, the likelihood that each fiber will be adequately coated with bonding size is improved. For the continuously formed glass reinforcing fibers, the desired spreading apart occurs as a natural consequence of the fibers being drawn from a bushing. For the preformed fibers, a separate step of spreading the fibers is involved (e.g., running the fibers over a spreading bar, guiding each fiber through a separate guide eye, etc.). It will be understood that tows or yarns of very small diameter fiber can be substituted for the individual preformed fibers. In which case, the bundle of small diameter fibers making up each yarn will not be spread apart or otherwise separated before the bonding size is applied and the yarns gathered together.

After the reinforcing fibers and the matrix fibers have been chemically treated and gathered together, the resulting one or more glass/polymer composite strands are formed into a unidirectional fabric either off-line from or in-line with the gathering step. When the reinforcing fibers and the matrix fibers are gathered together into a plurality of glass/polymer composite strands, the composite strands can be formed into multiple pieces of unidirectional fabric (e.g., using multiple fabric forming machines).

In accordance with a third aspect of the present invention, a unidirectional fabric is provided which comprises a plurality of stitching threads and a continuous glass/polymer composite strand in the form of a plurality of transverse loops, referred to as a weft. The loops of the weft are stitched together by the threads. The composite strand comprises a plurality of first reinforcing fibers drawn from a bushing of molten glass, a plurality of preformed matrix fibers made from a polymer matrix material, and bonding size which bonds together the fibers of the composite strand. It may be desirable for the composite strand to further comprise at least one preformed second reinforcing fiber. It may also be desirable for the reinforcing fibers to be coated with a first bonding size and the matrix fibers to be coated with a second bonding size.

Broadly speaking, the desirable dry weight content of bonding size in the composite strand is believed to be in the range of about 3% to about 20%. It is also believed to be more desirable for the dry weight content of bonding size to be in the range of about 5% to about 13%, and even more desirable for the dry weight content to be in the range of about 6% to about 8%. It has been found that by using such a high percentage of bonding size in accordance with the principles of the present invention, the resulting composite strand is and remains sufficiently coherent (i.e., has sufficient bonding between the fibers) and resilient enough to be shaped into the weft of a unidirectional fabric formed, for example, by knitting with a warp knitting machine.

The objects and advantages of the present invention will be apparent from the following description, the accompanying drawings, and the appended claims.

MODES FOR CARRYING OUT THE INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

Figure 1:
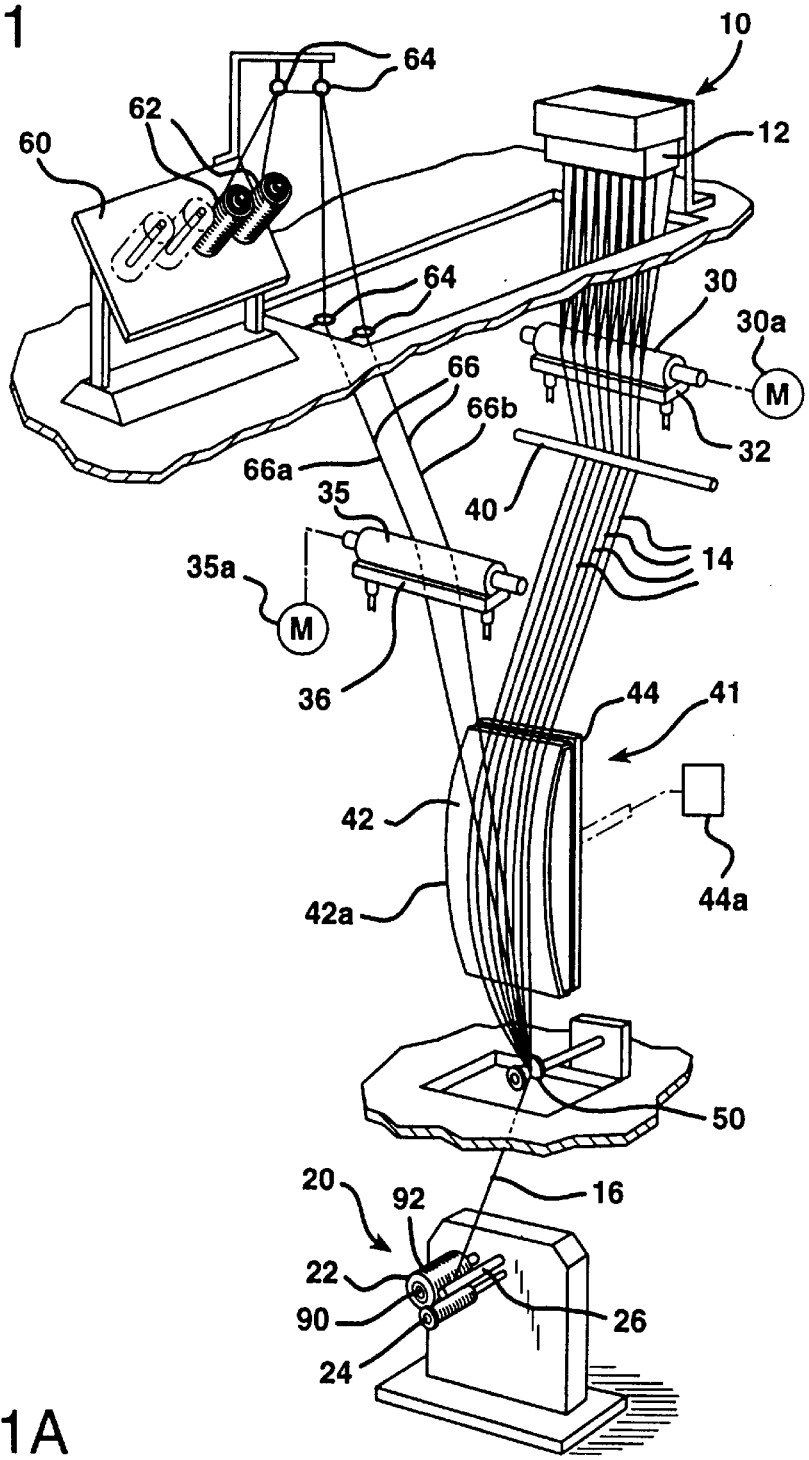
FIG. 1 is a perspective view of a composite strand forming apparatus constructed in accordance with a first embodiment of the present invention.
Figure 1A:
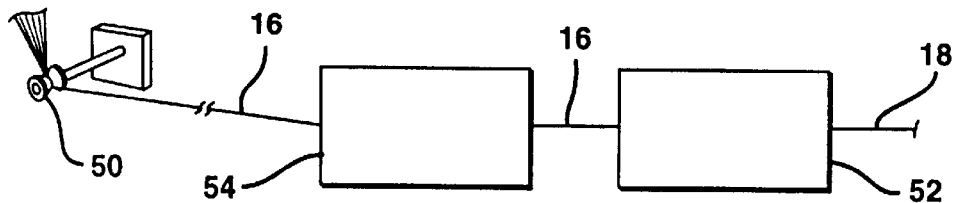
FIG. 1a is a side view of an in-line fabric forming machine.

Referring to FIG. 1, an apparatus 10 for producing a glass/polymer composite strand 16, suitable for being formed into a unidirectional fabric 18 (as shown in FIG. 1A) in accordance with the present invention, comprises a conventional bushing 12 having a number of orifices (not shown) through which a plurality of streams of molten glass are discharged. In the unidirectional fabric 18, the glass/polymer composite strand 16 is in the form of a plurality of transverse loops 17, referred to as a weft, which are stitched together by a plurality of threads 19, see FIG. 6. The orifices in bushing 12 may be extended by hollow studs or tips (not shown) in a conventional manner. In the FIG. 1 embodiment, the streams of glass are mechanically drawn to continuously form first or reinforcing fibers 14 via a winder device 20.

The reinforcing fibers 14 pass over a forward-facing, first applicator roller 30 which applies a first liquid coating of bonding size composition or bonding chemical treatment (also referred to herein as size/binder) to the fibers 14. The glass reinforcing fibers 14 may be misted with water using a prepad spray (not shown) located between the bushing 12 and the first applicator roller 30. The bonding size composition is typically aqueous based, but may be non-aqueous based, or any other type of chemical treatment adapted so as to suitably bond the fibers together. A two-part non-aqueous based bonding size may be used, but a one-part aqueous based bonding size is more desirable. Examples of two-part, non-aqueous based bonding size are set out in commonly assigned, U.S. patent application Ser. No. 08/487,948, filed Jun. 7, 1995, now abandoned, and entitled METHOD AND APPARATUS FOR THE IN-LINE IMPREGNATION OF FIBERS WITH A NON-AQUEOUS CHEMICAL TREATMENT, the disclosure of which is hereby incorporated by reference, in its entirety. A trough 32 containing the bonding size composition is positioned below the roller 30. The roller 30 extends into the trough 32 and transfers bonding size composition from the trough 32 to the fibers 14, as the roller 30 is rotated by a conventional drive device, such as a motor 30a. Other devices or techniques for applying size or other chemical treatments may be used in place of the applicator roller 30 to apply a bonding size to the glass fibers 14.

One or more packages or spools 62 of second fibers 66 are supported on a package supply rack 60. Each spool 62 supplies at least one second fiber 66. Each fiber 66 is made of a material other than that used to make the fibers 14. While only two spools 62 of fibers 66 are shown, it is understood that any suitable number of spools 62 of fibers 66 can be supplied in this manner. The second fibers 66 are withdrawn from the packages 62 via the winder device 20. The fibers 66 extend through an appropriate number of guide eyes 64, four in the illustrated embodiment, and pass over a rear-facing, second applicator roller 35. The guide eyes 64 serve to position the second fibers 66 so that they make good contact with the applicator roller 35 and control the point at which the fibers 66 engage a heating device 41, which will be discussed more explicitly below. The guide eyes 64 can be disposed so as to also help maintain the fibers 66 in a spread apart relation before the bonding size from applicator 35 is applied.

The rear-facing, second applicator roller 35 applies a second liquid coating of a bonding size composition (also referred to herein as size/binder) to the second fibers 66. The bonding size composition applied to the second fibers 66 may be the same as or different from the bonding size composition applied to the first fibers 14. The type of bonding size used is dependant to a large degree upon the desired properties of the finished composite product made with the fabric 18. The type of bonding size used may also vary from one type of fiber material to another. A trough 36 containing the bonding size composition is positioned below the roller 35. The roller 35 extends into the trough 36 and, as it is rotated by a conventional drive device 35a, transfers bonding size composition from the trough 36 to the second fibers 66. Other devices or techniques for applying size or other chemical treatments may be used in place of the applicator roller 35 to apply a bonding size to the second fibers 66.

The second fibers 66 can be chosen from a wide variety of compositions. For some applications, it is desirable for at least a substantial portion, if not all, of the second fibers 66 to be chosen from the group consisting of polymeric matrix fibers 66a which are made from a polymeric matrix material (i.e., one suitable for forming at least part of the matrix of a finished composite product that is made with the unidirectional fabric 18) and which may or may not be preformed (i.e., previously manufactured and collected). Suitable polymeric materials for matrix fibers 66a can be selected from the group which includes polyesters, polyamides, polypropylenes, and polyphenylene sulfides. It may also be desirable for some of the second fibers 66 to be chosen from the group consisting of reinforcing fibers 66b which are preformed and suitable for forming a reinforcing element in a finished composite product (not shown) made with the unidirectional fabric 18. Suitable materials for preformed second reinforcing fibers 66b can be selected from the group which includes S-glass, Kevlar® and graphite. It is also contemplated that any other suitable inorganic or organic fiber not specifically set out herein may also be employed.

The matrix fibers 66a can be coated with a different bonding size than the preformed reinforcing fibers 66b. If the preformed reinforcing fibers 66b are S-glass fibers, for example, it may be desirable to coat the fibers 66b with the same bonding size as the first glass fibers 14 drawn from bushing 12. If they are chemically treated separately, the preformed reinforcing fibers 66b can be either treated using the first applicator 30 or separately treated using a third applicator, similar to applicator 30 or 35. In addition, the one or more packages of the fibers 66b can be supported on a rack that is similar to but separate from rack 60, with the fibers 66b being guided using guide eyes 64 or separate guide eyes (not shown) which are suitably positioned.

After passing over the first applicator roller 30, the glass reinforcing fibers 14 pass over and contact a heating device 41 which is substantially similar to the heating device set out in commonly assigned, copending U.S. patent application Ser. No. 08/291,801, filed Aug. 17, 1994, now abandoned and entitled "Method and Apparatus for Forming Continuous Glass Fibers," the disclosure of which is hereby incorporated by reference, in its entirety. An engagement roller or bar 40, formed from a ceramic material, is provided between the first applicator roller 30 and the heating device 41 to ensure that the first fibers 14 make good contact with both the first applicator roller 30 and the heating device 41, see FIGS. 1 and 2. In addition, roller or bar 40 helps to spread apart the first reinforcing fibers 14 before they are commingled and gathered with the second fibers 66.

The heating device 41 comprises a first plate 42 having a curved outer surface 42a which is directly contacted by the fibers 14. It has been found desirable for the fibers 14 to contact the surface 42a along its entire extent. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the chemically treated fibers 14. When an aqueous based chemical treatment is employed, the heat transferred from the first plate 42 to the fibers 14 evaporates water from the chemical treatment.

It is desirable for the second fibers 66 to contact the first plate 42 at a position below the mid-point of the plate 42 such that the fibers 66 engage only about ⅓ of the length of the plate 42. This prevents possible over-heating of the second fibers 66. Obviously, the type of material used for the second fibers 66 will determine the amount of acceptable heat exposure. In this situation, "acceptable heat exposure" means the amount of heat energy that can be applied to the second fibers 66 before their physical characteristics are greatly altered. For example, the polymer matrix fibers 66a, which are intended to melt when the composite strand 16 is used to make a finished composite product (not shown), would be particularly susceptible to over-heating. Other second fibers 66, such as various non-polymeric reinforcing fibers 66b, will be less susceptible to over-heating and can contact the plate 42 along more than ⅓ of its length.

Figure 2:
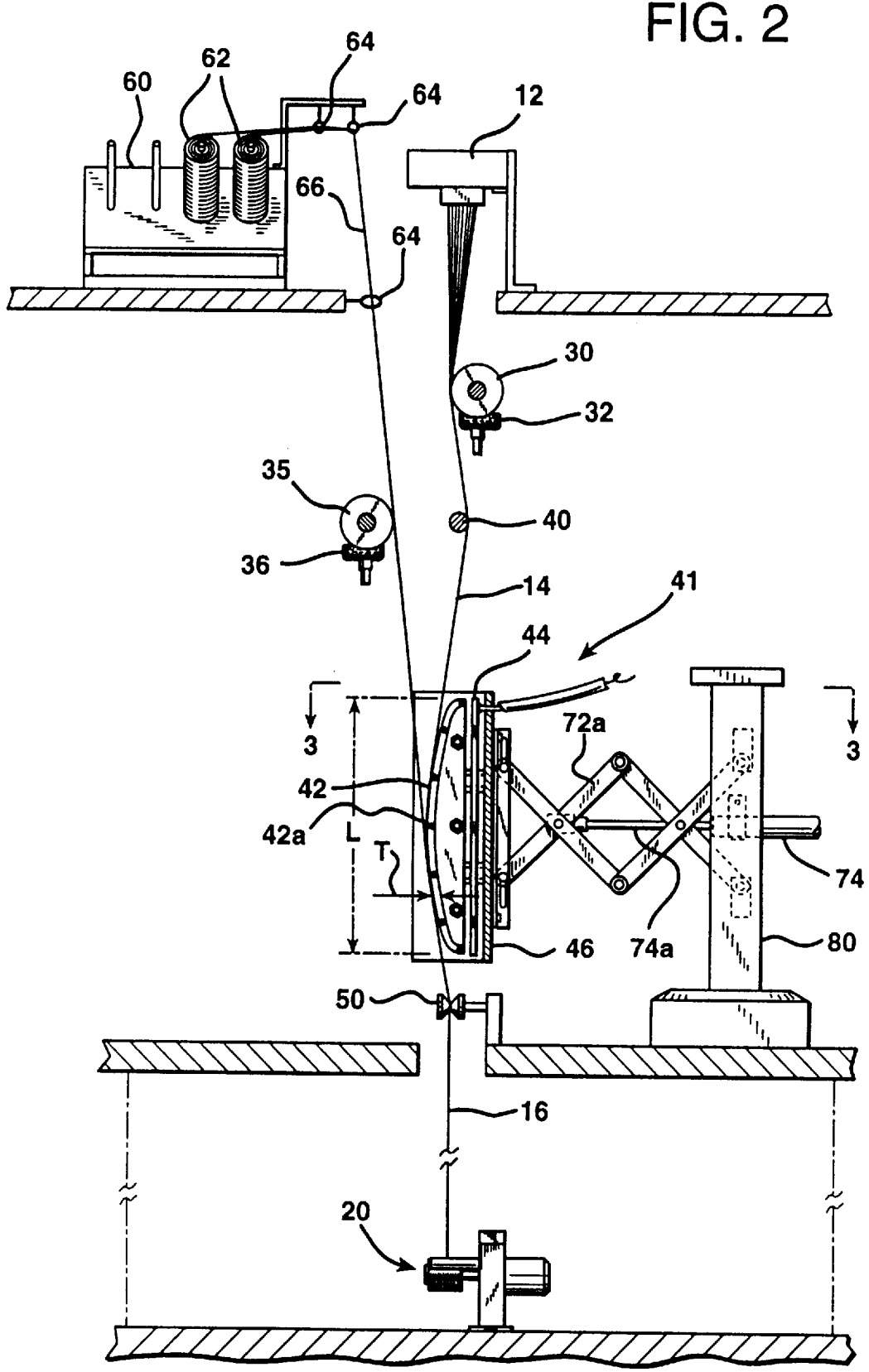
FIG. 2 is a side view of the apparatus illustrated in FIG. 1.

The first plate 42 can have a length L=40.0 inches, a thickness T=0.375 inch, and a radius of curvature equal to 267 inches, see FIG. 2. The plate 42 is formed from metal, such as stainless steel or copper. It is desirable for the plate 42 to be maintained at a temperature of between 1000° F. and 1500° F., and more desirable at a temperature of 1200° F.

In accordance with one embodiment of the present invention, the size/binder comprises: water; a film former; one or more coupling agents, such as silane coupling agents which are commercially available from OSI Industries under the product names A1100 and A1120; one or more lubricants such as a fatty acid ester which is commercially available from the Stepan Co. under the product name KESSCO BES, and a mixture of stearic acid and acetic acid which is commercially available from Owens-Corning Fiberglas under the product name K12; and modifiers such as a maleic anhydride modified polypropylene wax which is commercially available from the Chemical Corporation of America under the product name Polyemulsion 43N40, terephthalic acid which is commercially available from the Aldrich Chemical Company, and a partial ammonium salt of butadiene-maleic acid copolymer which is commercially available from Lindau Chemical Inc. under the product name Maldene 286. It has been found desirable for the film former to comprise a vinyl acrylic, such as those commercially available from Franklin International under the product names Covinax 201 and Covinax 225, or a urethane such as the one commercially available from Reichold Chemicals Inc. under the product name Synthemul 97903-00. Also, epoxies, polyvinyl acetates, and polyesters can be used as film formers in the present invention.

As the second fibers 66 engage the first plate 42, they become commingled with the first fibers 14, which are spread out across the first plate 42. After passing over the first plate 42, the first and second fibers 14 and 66 are gathered together via a gathering shoe 50 to form the single composite strand 16. From the gathering shoe 50, the strand 16 can be wound via the winder device 20, a Type-30™ winder device in the illustrated embodiment, onto a sleeve or tube 90, see FIG. 1, to form a composite strand package 92. The winder device 20 comprises a rotatable member or a collet 22, upon which is provided the removable tube 90. The winder device 20 also includes a conventional traversing mechanism 24 to distribute the strand 16 along the length of the tube 90 to form a square-edge package. Also provided is an air supply device 26 which outputs a plurality of streams of air which impinge upon the strand 16 to cool the strand 16 before it is wound.

Figure 6:
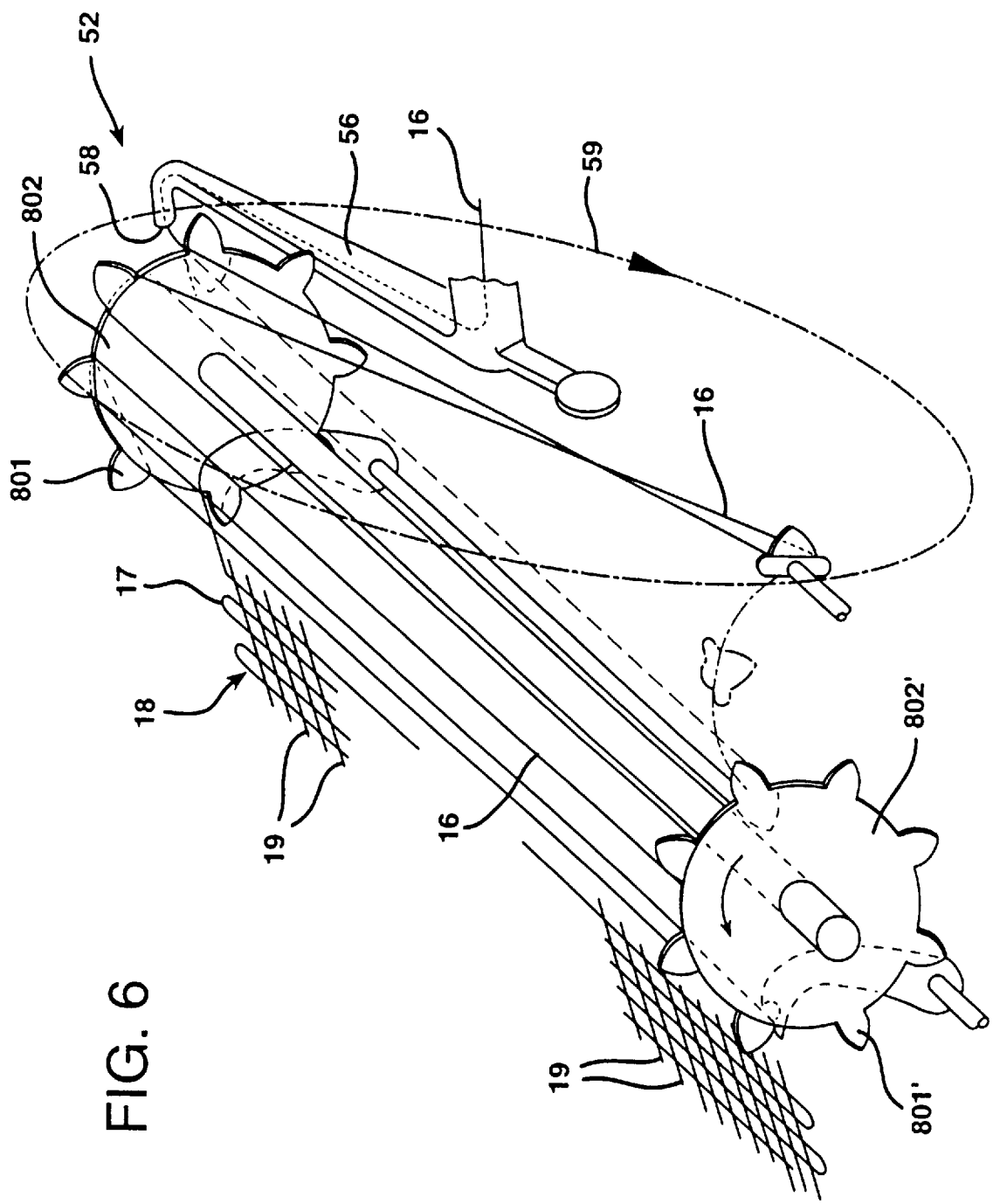
FIG. 6 is a perspective view of part of a Raschel knitting machine showing a thread storage device with holder members serving as storage members and with a yarn feeder.

The resulting composite strand 16 is resilient and coherent enough to be formed into the unidirectional fabric 18 using a fabric forming mechanism 52, (as shown in FIG. 6) such as the warp knitting machine set out in U.S. Pat. Nos.

3,648,459 and 3,701,267 (see FIG. 6), the disclosures of which are hereby incorporated by reference, in their entirety. The composite strand 16 can either be packaged, as above described, and then knitted into the unidirectional fabric 18 off-line or the knitting machine 52 can be connected in-line with the gathering mechanism 50 (see FIG. 1A). The resulting fabric 18 is subsequently supplied to an original equipment manufacturer ("OEM") as a glass mat thermoplastic ("GMT") product, supplied to a compression molding machine (not shown) or otherwise processed into a finished composite product, either off-line or in-line. The in-line arrangement is preferred because it is more efficient and reduces manufacturing costs.

With the in-line embodiment of FIG. 1A, the single strand 16 coming from the gathering shoe 50 is continuously fed into the knitting machine 52 to thereby continuously form the unidirectional composite fabric 18, as shown in FIG. 6. Initially, during at least the set-up stage of the knitting operation, a strand pulling mechanism 54 (e.g., a conventional pull wheel, a hand-held aspirator gun, such as that available from Slack and Parr, Inc. of Charlotte, N.C., No. 328-009-1329, assembly no. A300019, etc.) can be used to pull the composite strand 16 and draw the glass reinforcing fibers 14. Once enough of the composite strand 16 is pulled past the pulling mechanism 54, the free end of the strand 16 is connected by hand and threaded through the knitting machine 52. The strand 16 can be connected to the knitting machine 52, for example, by prethreading the knitting machine 52 with a leader strand (not shown) having a trailing end which is joined to the continuous composite strand 16, such as by tying, splicing, etc. Alternatively, the composite strand 16 can itself be threaded through the machine 52. In either case, once the strand 16 is connected, the machine 52 is then operated at a faster speed than that of the pulling mechanism 54 until any slack length of the strand 16 therebetween is taken up. The speed at which mechanism 54 pulls the composite strand 16 and the operating speed of the knitting machine 52 can be adjusted so as to match one another. At this point, assuming the knitting machine 52 is capable, the pulling mechanism 54 is disconnected from the composite strand 16 and the knitting machine 52 is used solely to pull the strand 16 and draw the glass fibers 14. It is believed that the warp knitting machine 52 partially shown in FIG. 6 and fully disclosed in the incorporated U.S. Pat. No. 3,701,267 would be capable of providing the pulling force required to form the composite strand 14 without having to continue to use the pulling mechanism 54.

The need for an improved glass/polymer composite strand 16 for making a unidirectional fabric 18 is apparent when the operation of the warp knitting machine 52 of the U.S. Pat. No. 3,701,267 patent is reviewed. Among other pertinent features, the knitting machine 52 of FIG. 6 includes a hollow crank shaped rod 56 with a free end mounting a thread guide 58. The rod 56 rotates so that the guide 58 follows a circular path 59. The composite strand 16 is threaded through rod 56, and as the rod 56 rotates, the strand 16 passes through rod 56, out guide 58 and is wrapped around holder members 801 and 801', provided on respective rotating discs 802 and 802'. In this way, the strand 16 is formed into the plurality of loops 17 in fabric 18. If the fibers 14 and 66 were not uniformly bonded together, in accordance with the principles of the present invention, the resulting composite strand would be less likely to remain coherent enough to be formed into the unidirectional fabric 18. In addition, even if a unidirectional fabric could be made, without the uniform bonding afforded by the present invention, the resulting fabric would likely be incoherent to the point of adversely affecting the properties of a finished composite product made therefrom.

The loops 17 are stitched and held together by the plurality of threads 19, for example, in the manner described and taught in the U.S. Pat. No. 3,701,267 patent incorporated herein. The threads 19 may comprise a matrix material (e.g., the matrix material used to form the preformed matrix fibers 66a) and/or a reinforcing material (e.g., the reinforcing material used to form the preformed reinforcing fibers 66b). Though, it may be desirable not to use a reinforcing material for part or all of each thread 19, since the threads 19 cross and contact the loops 17 of the strand 16. Contact between the glass fibers in strand 16 and threads 19 comprising a reinforcing material, in particular another glass reinforcing material, may have detrimental effects.

The process of the present invention produces a composite strand 16 having a glass (first fibers 14) percentage of about 30 to 70 weight percent, a second fiber material (second fibers 66) percentage of about 30 to 70 weight percent, and a dry weight percentage of binder/size in the range of about 3% to about 20%. The process can also produce a composite strand having from about 5 to about 90 weight percent of second fiber material (second fibers), most of which comprising a matrix material. It is also believed to be more desirable for the dry weight content of bonding size to be in the range of about 5% to about 13%, and even more desirable for the dry weight content to be in the range of about 6% to about 8%. It has been found that by using such a high percentage of bonding size in accordance with the principles of the present invention, the resulting composite strand 16 is and remains sufficiently coherent (i.e., has sufficient bonding between the fibers) and resilient enough to be shaped into the weft of a unidirectional fabric 18 formed, for example, by knitting with the warp knitting machine disclosed in the U.S. Pat. No. 3,701,267 patent.

Figure 3:
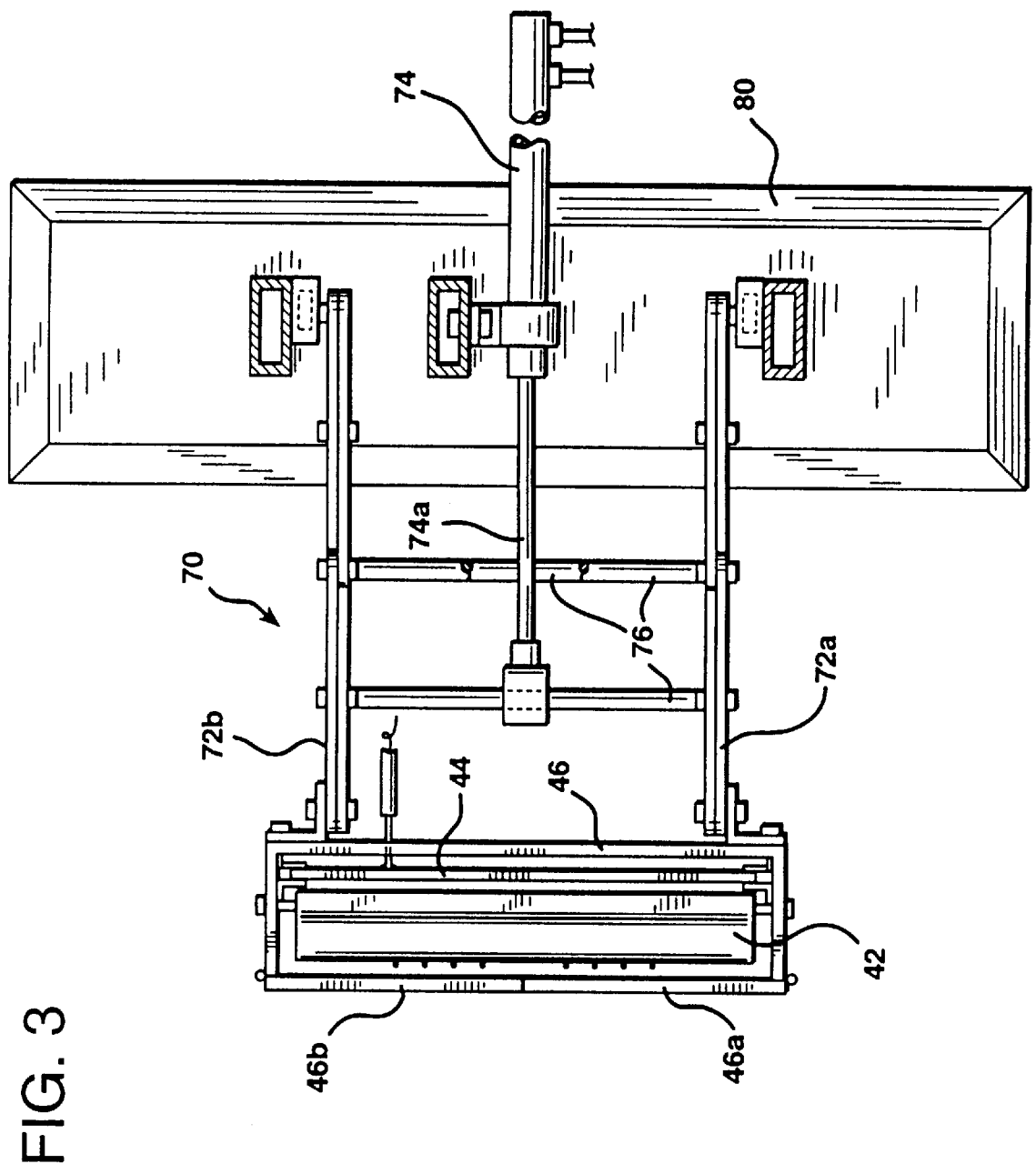
FIG. 3 is a view taken along view line 3—3 in FIG. 2.

Referring now to FIGS. 2 and 3, the first and second plates 42 and 44 are housed within a cabinet 46, which is moveable toward and away from the fibers 14. The cabinet 46 includes first and second doors 46a and 46b which, when closed, serve as heat shields. It is desirable for the doors 46a and 46b to be formed from insulation board, such as 1 inch thick calcium silicate.

A reciprocating device 70 is provided for moving the cabinet 46 toward and away from the fibers 14. The device 70 comprises first and second linkage mechanisms 72a and 72b and a piston-cylinder drive unit 74. The linkage mechanisms 72a and 72b are connected to the cabinet 46 and to a support 80. The piston-cylinder drive unit 74 extends from the support 80 and is fixedly connected to one of a plurality of support members 76 extending between the first and second linkage mechanisms 72a and 72b, see FIG. 3. Reciprocating movement of the piston 74a of the drive unit 74 effects movement of the cabinet 46 and, hence, the first plate 42.

Figure 4:
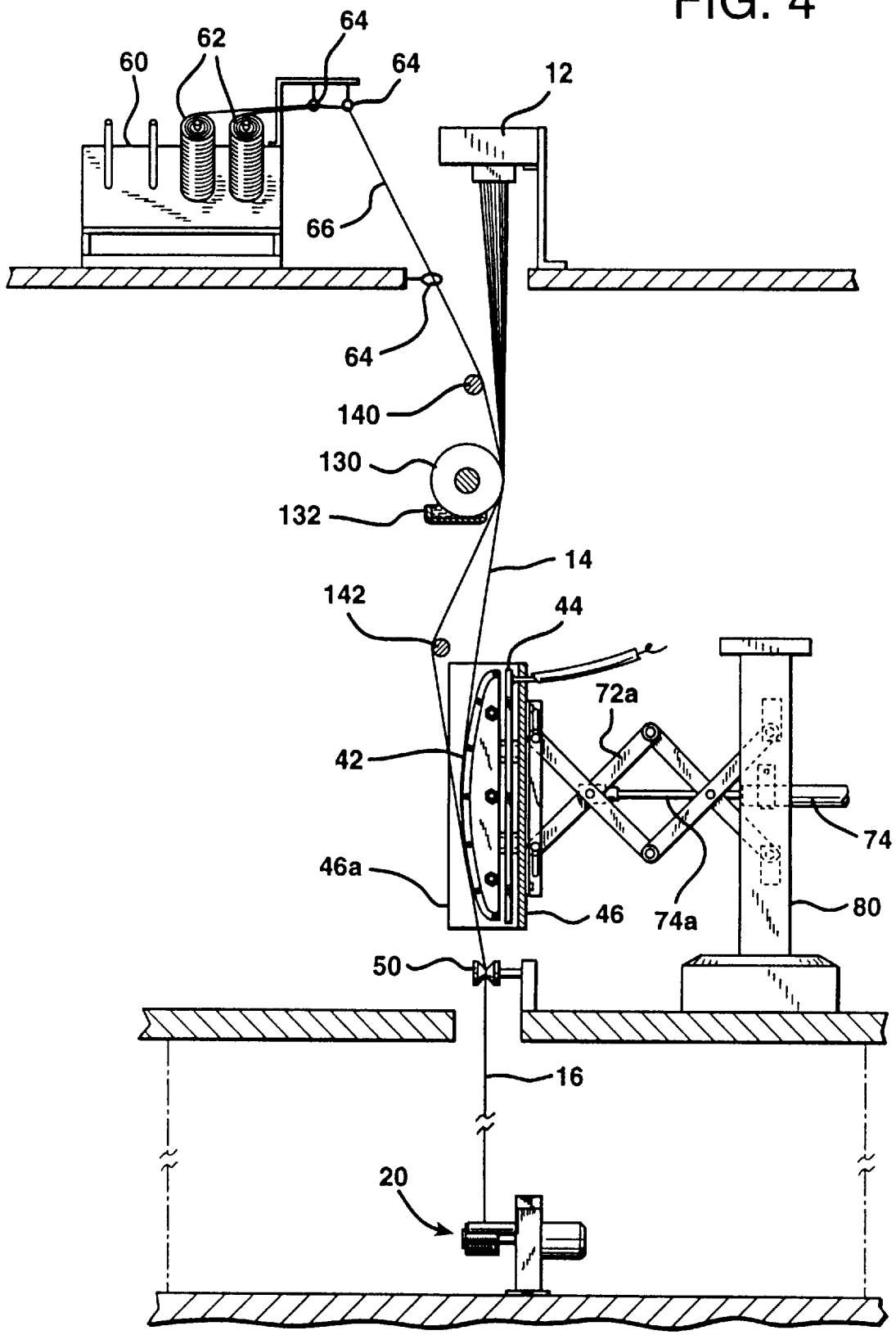
FIG. 4 is a side view of a composite strand forming apparatus constructed in accordance with a second embodiment of the present invention.

In a first alternative embodiment shown in FIG. 4, where like reference numerals indicate like elements, a single applicator roller 130 is used to apply bonding size composition to both the first and second fibers 14 and 66. A trough 132 containing the bonding size composition is positioned below the roller 130. In this embodiment, the second fibers 66 pass over a first positioning bar or roller 140 prior to making contact with the applicator roller 130 and engage a second positioning bar or roller 142 after contacting the applicator roller 130 but before engaging the plate 42. The first positioning bar 140 tends to provide a spreading effect, to help keep the fibers 66 separated for improved wetting when the bonding size is applied.

Figure 5:
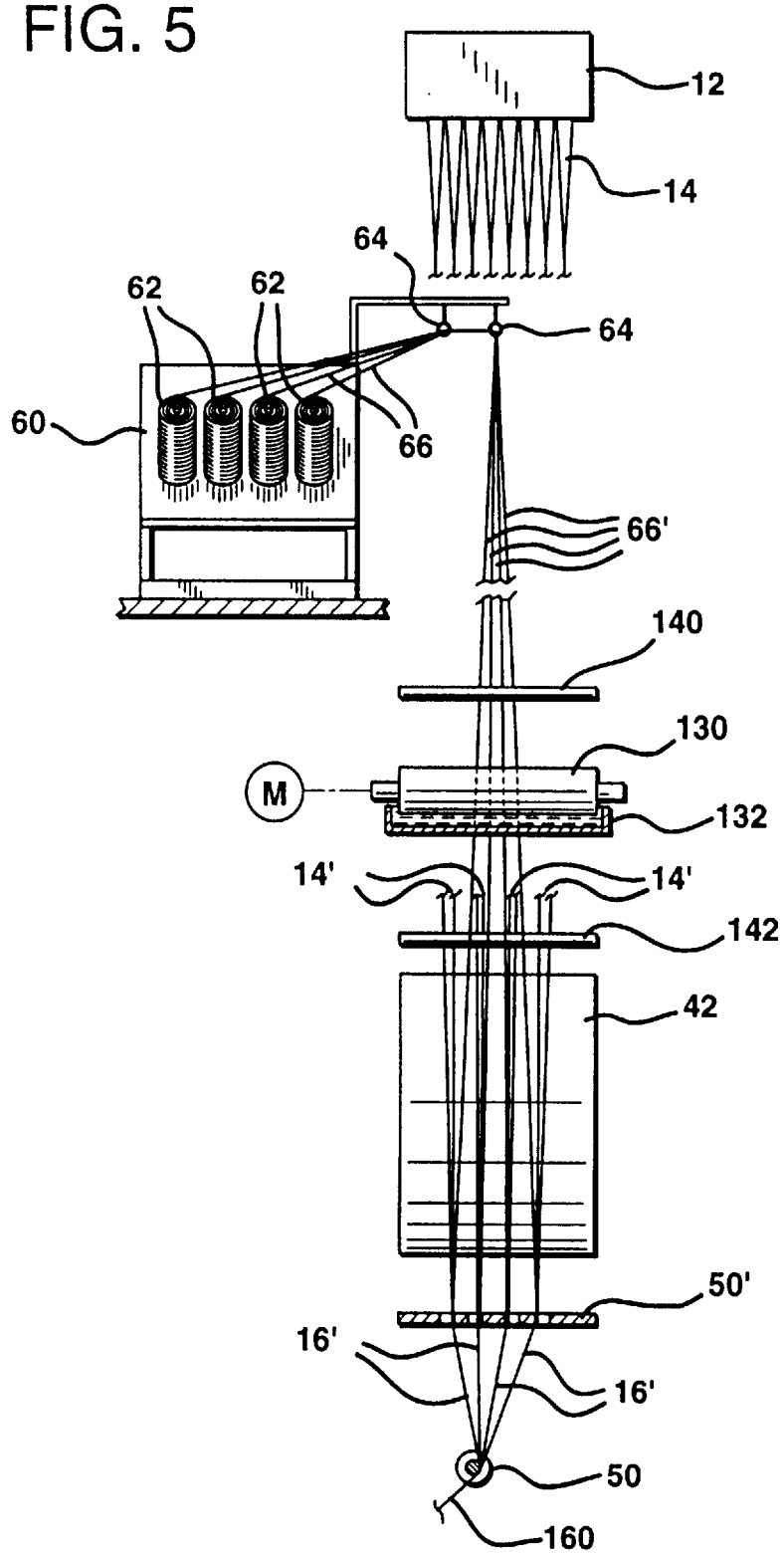
FIG. 5 is a front view of a composite strand forming apparatus constructed in accordance with a third embodiment of the present invention.

In a second alternative embodiment shown in FIG. 5, the applicator roller 130 and the positioning bars 140 and 142 are positioned as shown in FIG. 4 such that only the second fibers 66 engage the first and second positioning bars 140 and 142 and both the first and second fibers 14 and 66 pass over the applicator roller 130. A separating shoe 50' is used to separate and gather the second fibers 66 into second fiber groups or tows 66' comprising one or more second fibers 66 and to separate and gather the first fibers 14 into a like number of first fiber groups or tows 14' comprising one or more first fibers 14. Each first fiber group 14' becomes commingled and gathered with a second fiber group 66' such that a plurality of discrete composite strands 16' are formed. The discrete strands 16' may themselves be gathered by a gathering shoe 50 into a combined single strand 160. The combined single strand 160 can then be formed into a unidirectional fabric 18 via a fabric forming mechanism 52, such as the warp knitting machine of the U.S. Pat. No. 3,701,267, in the manner described above for the strand 16 (see FIGS. 1 and 1A). Alternatively, the discrete strands 16' may each be formed into a unidirectional fabric 18 via one of a corresponding number of fabric forming mechanisms 52, in the manner described above for the strand 16 (see FIGS. 1 and 1A).

The method and apparatus of the present invention produce a unidirectional fabric having a composite strand weft with several advantages over the prior art. First, the process is capable of producing unidirectional fabric with ternary, quaternary, or even more complex composite strands. For example, the composite strand can contain several kinds of reinforcing glass fibers, such as E-glass and S2-glass fibers, several kinds of other reinforcing fibers, such as Kevlar® and graphite fibers, and also contain several kinds of diverse matrix materials, such as polyesters, polyamides, polypropylenes, and polyphenylene sulfides. Secondly, the composite strands used in the fabric of the present invention demonstrate improved dispersion of the reinforcing fibers found therein and, it is believed, will likewise result in improved fiber dispersion in the finished composite product formed from the present fabric. Third, the binder/size used in the composite strands found in the fabric of the present invention, including the amount of binder/size and how it is applied, is believed to enhance the cohesiveness and resiliency of the composite strand and thereby the resulting fabric to the point that the finished composite product, made from the fabric, will exhibit improved composite properties, including the mechanical properties of tensile and impact strength. Furthermore, different binder/size compositions can be used to make the composite strands forming the present unidirectional fabric by way of separate applicators. This feature can help optimize the properties of the resulting unidirectional fabric, and thus the finished composite product made therefrom, when one binder/size would be more compatible with one type of fiber being used (e.g., a reinforcing fiber) and another binder/size would be more compatible with a different type of fiber being used (e.g., a matrix fiber or a different reinforcing fiber).

The following examples are given to illustrate certain preferred details of the invention, it being understood that the details of the examples are not to be taken as in any way limiting the invention thereto. Each of these examples describe the making of a glass/polymer composite strand which, it is believed, can be directed into a fabric forming mechanism 52, as described above, to form the resulting composite strand into a unidirectional glass/polymer fabric. An example of such a fabric forming machine is a warp knitting machine, like that disclosed in the U.S. Pat. Nos. 3,648,459 and 3,701,267, which are incorporated herein.

EXAMPLE 1

Glass marbles were melted and drawn through a two thousand hole bushing at the rate of 900 feet per minute (fpm) at a yield of thirty three pounds per hour. The resultant fibers had the "M" (16 micron) filament diameter. The newly formed E-glass fibers were immediately cooled with a prepad spray of water. The fibers were then treated with the chemical treatment formulation of Example 5 via a forward facing applicator roller. The fibers were held against the applicator surface by a ceramic bar which slightly alters the fiber direction. Polyamide fiber of 1260 denier, commercially available from Dupont Chemical under the product designation "Nylon 66, 1400 decitex/1260 denier, 210 fil, R20 TWT, Type 728" was roved in a separate operation into two 15 pound packages, each of 2520 to 5040 denier. These packages were placed on a package supply rack located at the bushing level of the glass forming operation. The two polymer fiber ends were then pulled through two ceramic guide eyes at the bushing level, through two ceramic guide eyes mounted immediately above a rear-facing second applicator roller, over the rear facing applicator roller which applied the bonding size composition of Example 5 to the two polymer fibers, and into the glass stream. The commingled polymer and glass fibers were dried on a forty inch heated plate, which was heated to a temperature of approximately 1200° F. and gathered to form a glass/polymer composite strand.

EXAMPLE 2

Polypropylene fibers and glass fibers were commingled in the same manner as described in Example 1 with the exception that the chemical treatment formulation of Example 7 was used. Polypropylene fiber of 2520 denier, which is commercially available from Amoco/Phillips under the product designation "MARVESS Olefin Filament Yarn and J01 Natural 2520 DEN-210-00, " was roved in a separate operation into two 15 pound packages, each of 5040 to 10080 denier. These packages were placed on the package supply rack located at the bushing level and two roved fibers of polypropylene were used to produce, as above described, a polypropylenelglass commingled composite strand.

EXAMPLE 3

Polyphenylene sulfide fibers and glass fibers were commingled in the same manner as described in Example 1 with the exception that the chemical treatment formulation of Example 9 was used. Polyphenylene sulfide fiber of 200 denier, which is commercially available from Amoco/Philips under the product designations "polyphenylene sulfide-filament" or "staple CP-1-26G" was roved in a separate operation into three 15 lb. packages, each of 1000 denier. These packages were placed on a package supply rack located at the bushing level and three roved fibers of polyphenylene sulfide were used to produce, as above described, a commingled composite strand.

EXAMPLE 4

S2-glass was commingled with E-glass in a manner similar to the way the polymer fibers were commingled with the E-glass fibers in Example 1. In this case, two packages of S2-glass, which is commercially available from Owens Corning Fiberglas under the product designation "Product 449, Yield=750," was placed on the package supply rack located at the bushing level. Two ends of S2-glass were pulled into the E-glass stream in exactly the same way that the ends of polyamide fibers were pulled into the E-glass stream in Example 1. The bonding size composition set out in Example 9 below was applied to both the S2-glass and E-glass. The loading of S2-glass, incorporated into the resulting composite strand using this method, ranged from (20% to 40%).

EXAMPLE 5

Six thousand (6000) grams (g) of binder was formed by the following procedure: 15 g (0.25% weight percentage as received) of A-1100 silane was added to 2345 g of deionized water. This was stirred for several minutes. One thousand eight hundred seventy-five (1875)g (31.25%) of the film former Covinax 201 and 1500 g (25.0%) of the film former Covinax 225 were combined in a two gallon pail. The silane solution was then mixed with the mixture of film formers using moderate agitation. Four hundred eighty (480)g (8.0%) of Maldene 286 was added to the mixture of silane and film formers. Finally, 200 g (3.3%) of BES homogenate was added under continual stirring. The solids concentration of the resulting binder polymer solution was 30%. This binder polymer solution is useful where polyamide is commingled with glass, see Example 1 above.

EXAMPLE 6

Six thousand (6000) grams (g) of binder was formed by the following procedure: 15 g (0.25%) of A-1100 silane was added to 1870 g of deionized water. This was allowed to stir for several minutes. Three thousand four hundred fifty (3450)g (57.5%) of the film former Synthemul 97903-00 was poured into a two gallon pail. The silane solution was then mixed with the film former using moderate agitation. Four hundred eighty (480)g (8.0%) of Maldene 286 was added to the mixture of silane and film former. Finally, 200 g (3.3%) of BES homogenate was added under continual stirring. The solids concentration of the resulting binder polymer solution was 30%. This binder polymer solution is useful where polyamide is commingled with glass.

EXAMPLE 7

Six thousand (6000)g of binder was formed by the following procedure: 15 g (0.25%) of A-1100 silane was added to 2325 g of deionized water. This was allowed to stir for several minutes. One thousand eight hundred seventy five (1875)g (31.25%) of the film former Covinax 201 and 1500g (25.0%) of the film former Covinax 225 were combined in a two gallon pail. The silane solution was then mixed with the mixture of film formers using moderate agitation. A terephthalic acid solution was prepared by dissolving 30 g (0.5%) of terephthalic acid in 30 ml of concentrated ammonium hydroxide. The terephthalic acid solution was added to the mixture of silane and film formers. Then, 300 g (5.0%) of Polyemulsion 43N40 was added to the mixture. Finally, 200 g (3.3%) of BES homogenate was added under continual stirring. The solids concentration of the resulting binder polymer solution was 30%. This binder polymer solution is useful where polypropylene is commingled with glass.

EXAMPLE 8

Six thousand (6000)g of binder was formed by the following procedure: 15 g (0.25%) of A-1100 silane was added to 2020 g of deionized water. This was allowed to stir for several minutes. Three thousand four hundred fifty (3450)g (57.5%) of the film former Synthemul 97903-00 was poured into a two gallon pail. The silane solution was then mixed with the film former using moderate agitation. A terephthalic acid solution was prepared by dissolving 30 g (0.5%) of terephthalic acid in 30 ml of concentrated ammonium hydroxide. The terephthalic acid solution was added to the mixture of silane and film former. Then, 300 g (5.0%) of Polyemulsion 43N40 was added to the mixture. Finally, 200 g (3.3%) of BES homogenate was added under continual stirring. The solids concentration of the resulting binder polymer solution was 30%. This binder polymer solution is useful where polypropylene is commingled with glass.

EXAMPLE 9

Six thousand (6000)g of binder was formed by the following procedure: 15 g (0.25%) of A-1100 silane was added to 1870 g of deionized water. This was allowed to stir for several minutes. Three thousand four hundred fifty (3450)g (57.5%) of the film former Synthemul 97903-00 was poured into a two gallon pail. The silane solution was then mixed with the film former using moderate agitation. Finally, 200 g (3.3%) of BES homogenate was added under continual stirring. The solids concentration of the resulting binder polymer solution was 30%. The binder polymer solution is useful with a wide variety of materials including polyphenylene sulfide and inorganic fibers.

EXAMPLE 10

Six thousand (6000) g of binder was formed by the following procedure: 15 g (0.25%) of A-1100 silane was added to 2345 g of deionized water. This was allowed to stir for several minutes. One thousand eight hundred seventy-five (1875)g (31.25%) of the film former Covinax 201 and 1500 g (25.0%) of the film former Covinax 225 were combined in a two gallon pail. The silane solution was then mixed with the mixture of film formers using moderate agitation. Finally, 200 g (3.3%) of BES homogenate was added under continual stirring. The solids concentration of the resulting binder polymer solution was 30%. The binder polymer solution is useful with a wide variety of materials including polyphenylene sulfide and inorganic fibers.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

We claim:

1. A method for forming a unidirectional fabric with at least one glass/polymer composite strand, said method comprising the steps of:
    drawing a plurality of first reinforcing fibers from a source of molten glass;
    supplying a plurality of preformed matrix fibers made from a polymer matrix material;
    applying bonding size directly to said reinforcing fibers and said matrix fibers from at least one applicator before said reinforcing fibers are gathered together into a strand;
    gathering said reinforcing fibers and said matrix fibers together into at least one glass/polymer composite strand after said step of directly applying bonding size; and
    knitting in-line with said drawing and gathering steps said at least one glass/polymer composite strand into a unidirectional fabric.

2. The method as set forth in claim 1, wherein said method further comprises the step of supplying at least one preformed second reinforcing fiber.

3. The method as set forth in claim 1, wherein said step of applying bonding size comprises applying bonding size before said matrix fibers and said reinforcing fibers are commingled.

4. The method as set forth in claim 1, wherein said step of applying bonding size is performed before either of said reinforcing fibers and said matrix fibers are gathered together into a strand.

5. The method as set forth in claim 1, wherein said step of supplying comprises supplying said plurality of matrix fibers in tow form before said matrix fibers are gathered with said reinforcing fibers.

6. The method as set forth in claim 1, wherein said gathering step comprises gathering said reinforcing fibers and said matrix fibers together into a plurality of glass/polymer composite strands.

7. The method as set forth in claim 6, wherein said knitting step comprises knitting said plurality of glass/polymer composite strands into pieces of unidirectional fabric.

8. The method as set forth in claim 1, wherein said applying step comprises the steps of:

applying a first bonding size to said first reinforcing fibers using a first applicator, and applying a second bonding size which is different from said first bonding size to said matrix fibers using a second applicator, said first and second bonding sizes are applied to said reinforcing fibers and said matrix fibers before said reinforcing fibers and said matrix fibers are gathered together into a strand.

* * * * *